July 15, 1969  H. STATZ ET AL  3,456,210
TRAVELING WAVE SINGLE MODE LASER
Filed May 1, 1963  2 Sheets-Sheet 1

INVENTORS
HERMANN STATZ
CHUNG-LIANG TANG
BY Francis J. Thornton
ATTORNEY

United States Patent Office 3,456,210
Patented July 15, 1969

3,456,210
TRAVELING WAVE SINGLE MODE LASER
Hermann Statz, Wayland, and Chung-Liang Tang,
Boston, Mass., assignors to Raytheon Company,
Lexington, Mass., a corporation of Delaware
Filed May 1, 1963, Ser. No. 277,224
Int. Cl. H01s 3/18
U.S. Cl. 331—94.5   3 Claims This invention relates to the generation and amplification of coherent electromagnetic radiation and has particular reference to the generation and amplification of single mode spectra and to improved means and devices for producing regular spiking and single mode operation from a selected source.

Devices for producing coherent electromagnetic radiation of optical wavelength are known and comprise a body of coherent radiation-producing material which forms a resonant cavity placed within a reflector cavity along with a high intensity light source. The reflector cavity reflects energy from the source into the coherent radiation producing body. When the body is thus activated by large inputs of noncoherent white light, coherent radiation of a particular wavelength is emitted therefrom. Such devices are called lasers or optical masers.

Solid state lasers of the type described above have had a multitude of individual monochromatic modes going unstable simultaneously and show continuous random spiking in the output radiation. These standing wave lasers of the prior art produce multimodes in the output because the body of radiation-producing material is resonant to a number of modes whose frequency is separated by an amount equal to the velocity of light times the inverse of twice the length of the crystal.

It is desirable in a number of applications that the output of solid state lasers be single mode and not have random spiking in the output. Accordingly, the present invention describes a mechanism wherein single mode operation of a solid state laser is obtained.

The present invention comprises a solid state laser through which a traveling wave is propagated. More particularly, one specific illustrative embodiment of the present device comprises a solid state laser positioned so that monochromatic radiation emitted from the device in one direction travels along a feedback path through an optical isolator back into the solid state laser to provide a means for introducing into the solid state laser a traveling wave, while the radiation emitted from the other end of the solid state body and traveling in the opposite direction is totally attenuated by the isolator. Passing of the traveling wave through the solid state body and elimination of any standing waves in the body prevents the occurrence of multiple modes and provides single mode, regular spiking and continuous wave operation.

Further benefits of the present invention will be better understood from the following detailed discussion taken in conjunction with the accompanying drawings in which:

FIG. 2a shows a standing wave solid state laser rod;

FIG. 2b shows the field distribution of the first unstable longitudinal mode of FIG. 2a;

FIG. 2c shows the field distribution of the inverted population density for the case where only the mode of FIG. 2b oscillates;

FIG. 2d shows the field distribution of a second unstable longitudinal mode of the rod of FIG. 2a;

It has been suggested that the observed multimode spectra of the standing wave solid state laser can be explained due to slow spatial cross relaxation. In the normal laser comprising a ruby rod, made into a resonant cavity by providing mirrors at both ends, there are many principle or axial modes observed in the output which have a frequency spacing equal to the velocity of light times the inverse of twice the length of the crystal. In addition to these principle modes there are unresolved off-axes modes which differ in frequency only in the order of megacycles and whose presence is revealed by the fact that the angular beam spread is considerably larger than the expected diffraction limit.

Figure 1:
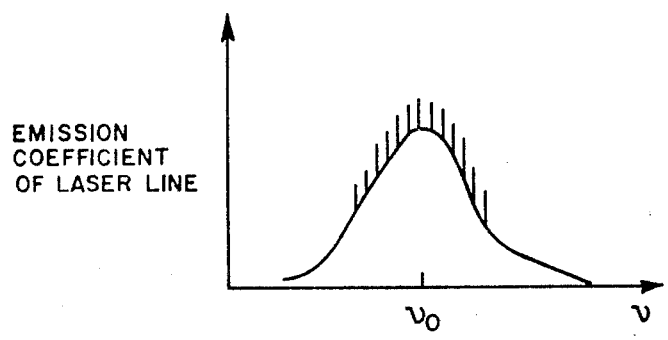
FIG. 1 is a diagram showing the emission coefficient and longitudinal cavity modes of a standing wave solid state laser.

The spectrum of the output of the usual standing wave solid state laser is as shown in FIG. 1. In this figure, some of the modes of the optical cavity are shown schematically. As the pump level is raised the mode in the center of the line will reach oscillation threshold first. If the spectral cross relaxation was infinitely fast enough the line shape would be retained for the gain of this mode would be at infinity while all other modes would have only a finite gain and thus could not oscillate. However, since in most crystals the line broadening is due to the influence of lattice vibrations the energy can be transferred within the line in a time equal to the period of typical lattice vibrations. Thus, it is believed that the observed output is due to slow spatial cross relaxation and not due to slow spectral cross relaxation.

Figure 2:
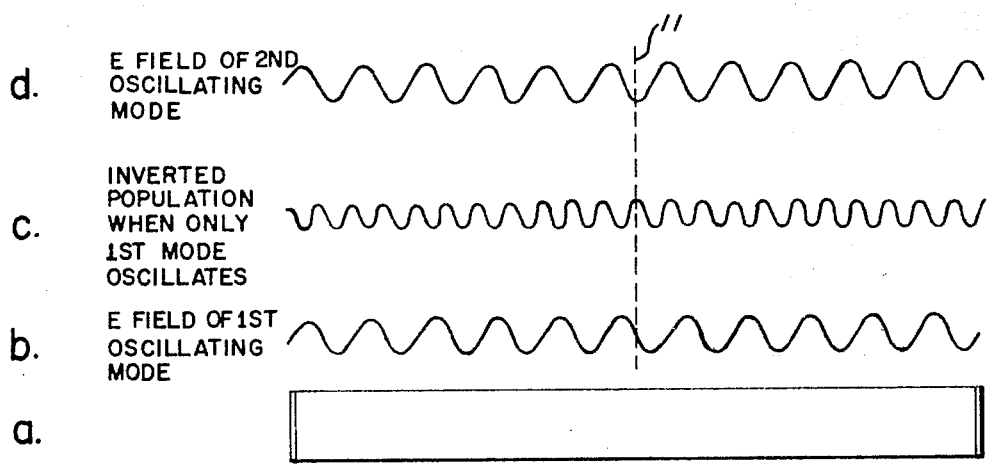

This is further explained in conjunction with FIG. 2. FIG. 2a shows a solid state laser rod coated at either end with a reflecting material so as to turn this rod into a resonant cavity. If we now assume that one axial mode reaches threshold then we have a standing wave of a particular wavelength as shown for example in FIG. 2b, set up within the rod shown in FIG. 2a. The standing wave thus created has nodal planes half-wavelengths apart and in parallel with the reflecting surfaces. The induced emission thus produced by this standing wave is zero at the nodal planes and maximum between. If we assume that no excitation can diffuse spatially, an inverted energy population having a maximum at the nodal planes and minima therebetween occurs as is shown in FIG. 2c. This distribution of the energy population is unfavorable to maintain the first described oscillating mode since where the electrc field of the mode is maxima the inverted population is minima, or at best, substantially reduced. Therefore, if a second axial mode which has a wavelength exceeding that of the first axial mode by half a wavelength more now reaches threshold then it will grow in amplitude and oscillate. For, in traversing both modes we find that when we arrive at line 11 that it is maxima for the second mode, minima for the first mode and maxima for the inverted population. Thus, since the maxima of the electric field of the second mode occurs where there is maxima in the density of the excited states this mode will thus have more gain than the first mode, which is already oscillating, and therefore also go into oscillation. This is based, of course, upon the assumption that the two frequencies of the first and second modes are sufficiently close for otherwise the despendence upon the location of the frequency in the line is also of importance. This situation also occurs for the third, fourth, fifth, etc. modes.

It should be noted that the above discussion is concerned solely with the longitudinal modes. It is thus apparent that it is necessary in order to prevent the occurrence of multiple modes that standing waves within the laser rod be avoided.

Figure 3:
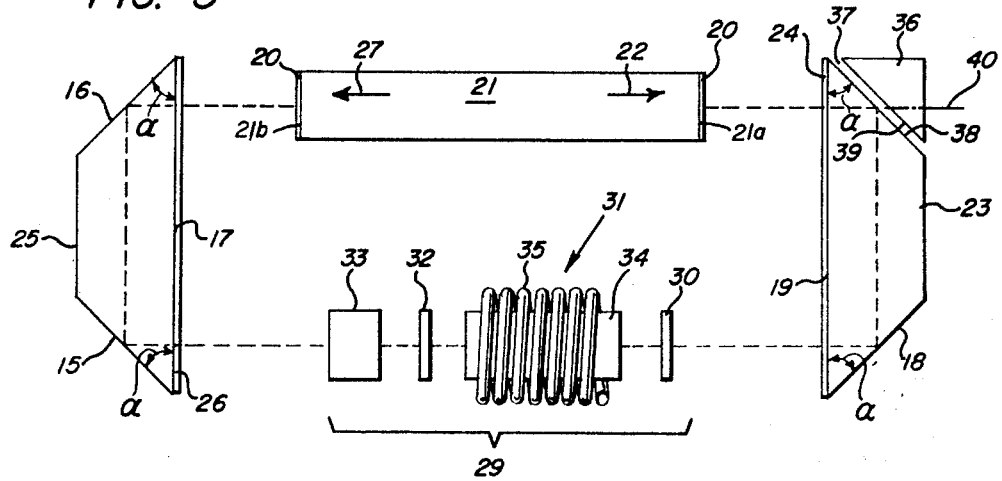
FIG. 3 is a schematic view of one embodiment of the present invention wherein unwanted multimode oscillation is suppressed and single mode oscillation is provided.

Shown in FIG. 3 is a traveling wave laser in which standing waves are prevented from existing and in which single mode operation is achieved. This mechanism comprises a solid state radiation-producing means made nonresonant and provided with a closed optical path or feedback loop containing an optical isolator through which a wave initiated in the means is propagated and returned to the means. The radiation-producing means preferably comprises a radiation-producing medium such as a ruby rod along with a high intensity input source such as a flash lamp inserted in a reflecting cavity and appearing similar to the type described in application, Ser. No. 155,651, filed Nov. 29, 1961, and assigned to the same assignee as the present invention. The device described in the copending application has the ends of the ruby rod coated with a reflecting material so as to make the rod resonant at optical frequency.

In the present application the ruby rod 21 of FIG. 3 has an antireflection coating 20 on either end in place of the reflecting material described in the copending application.

If we assume that a first longitudinal mode of monochromatic radiative energy begins oscillating within the laser rod 21 it will be emitted from the rod in both directions. Considering first the energy emitted from one end, say for example the end designated by numeral 21a, it is seen that this energy in the form of light passes along the dotted line in the direction indicated by arrow 22 through the antireflection coating 20 on the end 21a of rod 21 into a quartz prism 23. Prism 23 preferably has on the forward face 19 thereof an antireflection coating material 24 similar to the coating 20. Prism 23 is cut in such a manner that the incoming light is totally reflected at face 38 at a right angle and passed along the length of the prism 23 as shown by the dotted line until it strikes a second reflective surface at face 18 also cut in an appropriate angle such that the light is totally reflected at a right angle and passed out of prism 23 through face 19 and through an optical isolator generally designated as 29 onto a second quartz prism 25. Prism 25 also has an antireflection coating 26 on the forward face 17 thereof and is cut in such a manner that the incoming light strikes reflective faces 15 and 16 and thus passes through prism 25 in a manner similar to which it passed through prism 23 so that it emerges therefrom back into the radiation-producing body 21. This radiation enters body 21 at the end designated 21b, travels down the length of body 21 as a traveling wave, again emerging at the other end 21a to once again follow the path just described.

It should be understood that each time the traveling wave passes along body 21 it depletes the inversion population and thus gains in amplitude or intensity and further prevents the occurrence of other longitudinal modes. The light simultaneously emitted in a direction opposite to the arrow 22 and traveling in the direction designated by arrow 27 is totally attenuated by the optical isolator so only that light passing from end 21a in the direction of arrow 22 completes the optical path previously described to re-enter the rod 21 at end 21b as a traveling wave. Since the wace passing through rod 21 is a traveling wave and since the possibility of interference and occurrence of standing waves is eliminated the inverted population is continually depleted and depopulated in a uniform fashion so that no substantial unbalance can occur in the inverted population. Since substantial unbalance in the inverted population is avoided, the setting up and sustaining of a second oscillation mode is prevented. In the device built and utilized by the inventors the coherent radiation generator comprised a socalled LH-3 laser as offered for sale by the present assignee, which had reflecting surfaces on both ends of the ruby rod removed and replaced with antireflection coatings. Such antireflection coatings are preferably applied by vacuum deposition and may comprise, for example, single layers of magnesium fluoride deposited to a thickness equal to about one quarter-wavelength of radiation of about 0.8 micron wavelength. The antireflection coatings preferably have indexes of refraction less than that of the ruby rod whereupon they thus minimize the reflection within the ruby of useful emitted radiation. The prisms utilized consisted of quartz in a trapezoidal form with a base or longest face approximately six inches in length. This face was also coated with such an antireflection coating. The height and width of the prisms utilized were approximately one inch while the angle $\alpha$ was cut at 45° to produce a total reflection angle such that any light entering perpendicular to the coated face of the prism would be reflected and transmitted at a right angle down the length of the prism to a second total reflection angle of the same magnitude, whereupon it would be passed out of the prism in the desired direction. The optical isolator 29 comprised a polarizer 30 consisting, for example, of a sheet of Polaroid material, a Faraday rotator generally designated as 31, a second polarizer 32 and an optical rotator generally designated as 33. The Polaroid material used for polarizers 30 and 32 is sold commercially under the name of HN-38. Preferably, it has been found that when the distance between the front or coated face of prisms 23 and 25 is approximately 8⅛ inches that the Faraday rotator 31 should comprise a body of lead oxide glass 34 approximately ten centimeters in length and having approximately a 0.1 minute/gauss-cm. Faraday rotation at optical frequency and a solenoid 35. The solenoid in such conditions should preferably be capable of applying a field strength of approximately 4,000 gauss to body 34, whereupon the light passing through rotator 31 is rotated 45°. Quartz rotator 33 consists, for example, of a standard quartz rotator well known and used in the optical art and is preferably cut to a length such that incoming polarized light is rotated 45° when isolator 29 is made operative by the turning on of the magnetic field in solenoid 35. Any light traveling in the direction of arrow 27 entering optical isolator 29 is totally attenuated thereby so that only that light passing in the direction of arrow 22 completes the optical path described to re-enter rod 21 to provide a traveling wave therein. This assumes that polarizer 30 is vertically orientated while polarizer 32 is orientated at 45° with respect to polarizer 30. Since the only radiation now passing through the rod 21 is a traveling wave the inverted population is continually depleted in a substantially uniform fashion so that no substantial unbalance in this population occurs, thus preventing the sustaining of any second mode in oscillation since such a traveling wave de-excites the chromium atoms in the ruby rod 21 in a spatially uniform manner.

A convenient means of coupling a predetermined percentage of the energy produced within the single mode laser mechanism described above may comprise a triangular prism 36 made of the same material as prism 23 which is also cut at a 45° angle so that it will square off one corner of prism 23. If the spacing 37 between face 38 of prism 23 and face 39 of prism 36 is in the order of the wavelength of the light emitted by laser rod 21 then a predetermined percentage of the energy traversing the described feedback path will be coupled out of the mechanism along the dashed line 40 whereupon it can be put to use. If the spacing 37 is reduced to zero so that face 39 of prism 36 is directly in contact with face 38 of prism 23, the entire output of rod 21 may be thus obtained since this would reduce the reflection of face 39 from a substantially totally reflecting one to a nonreflecting face.

Figure 4A:
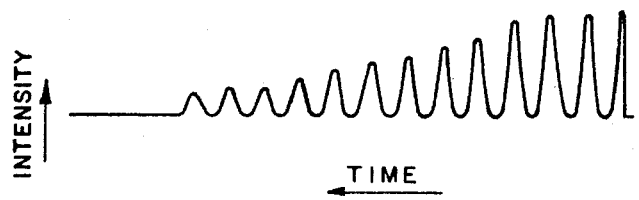
FIG. 4a shows the output of the device of FIG. 3 wherein 620 joules was the provided input.

The experimental results obtained with such a device as described in FIG. 3 are shown in FIGS. 4a, b and c. FIG. 4a shows the output of the device of FIG. 3 wherein 620 joules was the provided input, FIG. 4b shows the output of the device of FIG. 3 wherein 625 joules was the provided input and FIG. 4c shows the output of the device of FIG. 3 wherein 630 joules was the provided input.

When the isolator is made inoperative by turning off the magnetic field of the solenoid the well known random spiking output of a ruby laser is obtained. When, however, the isolator is made operative by turning on the magnetic field so that a 45° rotation of the polarized light is obtained within the lead oxide material 38 then a significant change in the laser output is observed.

For example, n FIG. 4a wherein the device is near threshold, the laser output shows completely regular damped spiking output as the simple single mode theory predicts.

Figure 4B:
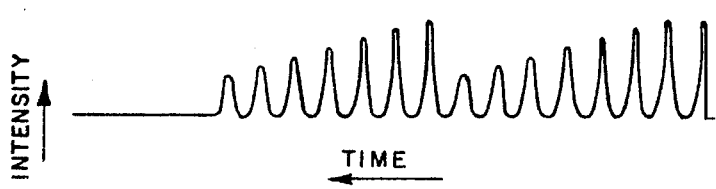
FIG. 4b shows the output of the device of FIG. 3 wherein 625 joules was the provided input.
Figure 4C:
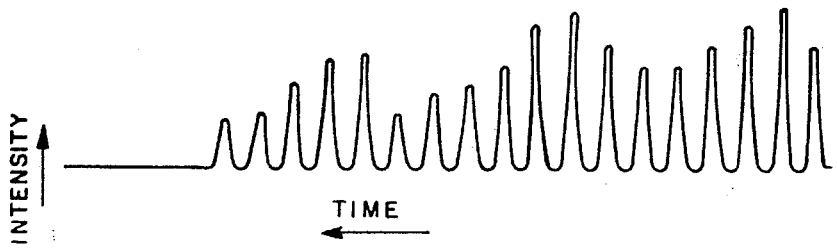
FIG. 4c shows the output of the device of FIG. 3 wherein 630 joules was the provided input.

As the pump power is increased, the output pattern becomes less regular as indicated in FIGS. 4b and 4c. This slight irregularity observed at the higher pumping levels may be due to the presence of off-axial modes of oscillation since these modes can not be suppressed by the oscillator but can be suppressed only by lenses and aperture plates inserted in the light path.

Since, as is shown particularly in FIG. 4a, the amplitude of the radiation reaches a uniform level before tapering off, continuous wave operation of the device is obtained in that a uniform amplitude of output radiation is sustained.

In addition to the arrangement shown in FIG. 3 it is obvious that the use of a Fabry-Perot interferometer in the light path shown could be used to further inhibit the build-up of undesirable modes. This use is especially suggested at high pump power. However, in order to suppress off-axes modes the arrangement shown in FIG. 3 would not be sufficient and the insertion of lenses and aperture plates as proposed in an article by J. G. Skinner and J. E. Geusic appearing in the Optical Society of America, published in October of 1962, will become necessary.

Additionally, in place of the prisms 23 and 25, as described in FIG. 3 above, mirrors could be utilized to direct the light so a traveling wave is propagated through the laser rod 21. It has also been found that the device can operate in the manner described even though polarizer 32 and polarizer 30 are removed from the system. Also, it should be understood that a light pipe comprised of glass tubing can be utilized to direct the light along the desired path. It is also apparent that in place of the solenoid 35 any means of rotating the light through the desired angle could be utilized.

It should be obvious that although a solid state laser using a ruby rod has been described as a preferred embodiment, the present invention is applicable to lasers utilizing other well known solid state mediums and is further applicable to so-called gaseous lasers. It is further believed it is obvious that other means of optically isolating the output radiation and of transporting the radiation in a closed optical path can be utilized and that the present invention should not be limited to the described embodiments except as defined by the appended claims.

What is claimed is:

1. A radiation-producing generator comprising a body of coherent radiation-producing material for producing and emitting beams of radiation from respective ends thereof, means for transmitting the beam of radiation from one of the respective ends of said body along a closed path externally of the body into the opposite end of the body to provide in said material a traveling wave, optical means in said path for attenuating the beam of radiation from the other respective end of said body, means for extracting an output from said generator, said optical means comprising a body of material exhibiting the Faraday rotation effect, a solenoid surrounding said body, a body of light-polarizing material adjacent said Faraday effect material and an optical rotator optically aligned with said body of light-polarizing and said Faraday effect material.

2. A radiation-producing generator comprising a body of coherent radiation-producing material for producing and emitting beams of radiation from respective ends thereof, means for transmitting the beam of radiation from each of the respective ends of said body along a closed path externally of the body into the opposite end of the body to provide in said material a traveling wave, optical means in said path for blocking the beam of radiation from one of said respective ends of said body while permitting passage of the beam from the other of said respective ends of said body, said closed path being void of any other means for blocking or attenuating the beam of radiation passing through said optical means, and means for extracting an output from said generator.

3. A radiation-producing generator comprising a body of coherent radiation-producing material for producing and emitting beams of radiation from respective ends thereof, means for transmitting the beam of radiation from one of the respective ends of said body along a closed path externally of the body into the opposite end of the body to provide in said material a traveling wave, optical means in said path for blocking the beam of radiation from the other respective end of said body while permitting passage of the beam from said one of the respective ends of said body, said optical means comprising a Faraday rotator and an optical rotator for rotating the planes of polarization of the beams of radiation and a plane polarizer optically associated with said Faraday and optical rotators for absorbing one of said beams while permitting transmission of the other beam, and means for extracting an output from said generator.

References Cited

A. Siegman, "Nonlinear Optical Effects: An Optical Power Limiter," Applied Optics, vol. 1, No. 6 (November 1922), pp. 739–744.

Bergstein et al., A Total-Reflection Solid-State Optical-Maser Resonator. Proc. IRE, vol. 50, No 8, August 1962, p. 1833.

D'Haenens et al., Lasers and their Applications. Journal of the SMPTE, vol. 71 (November 1962), pp. 828–831.

JEWELL H. PEDERSEN, Primary Examiner

WILLIAM L. SIKES, Assistant Examiner